M. POLACK.
WHEEL WITH DETACHABLE RIM FOR SOLID RUBBER TIRES.
APPLICATION FILED JULY 14, 1914.
1,146,205.
Patented July 13, 1915.
2 SHEETS—SHEET 1.
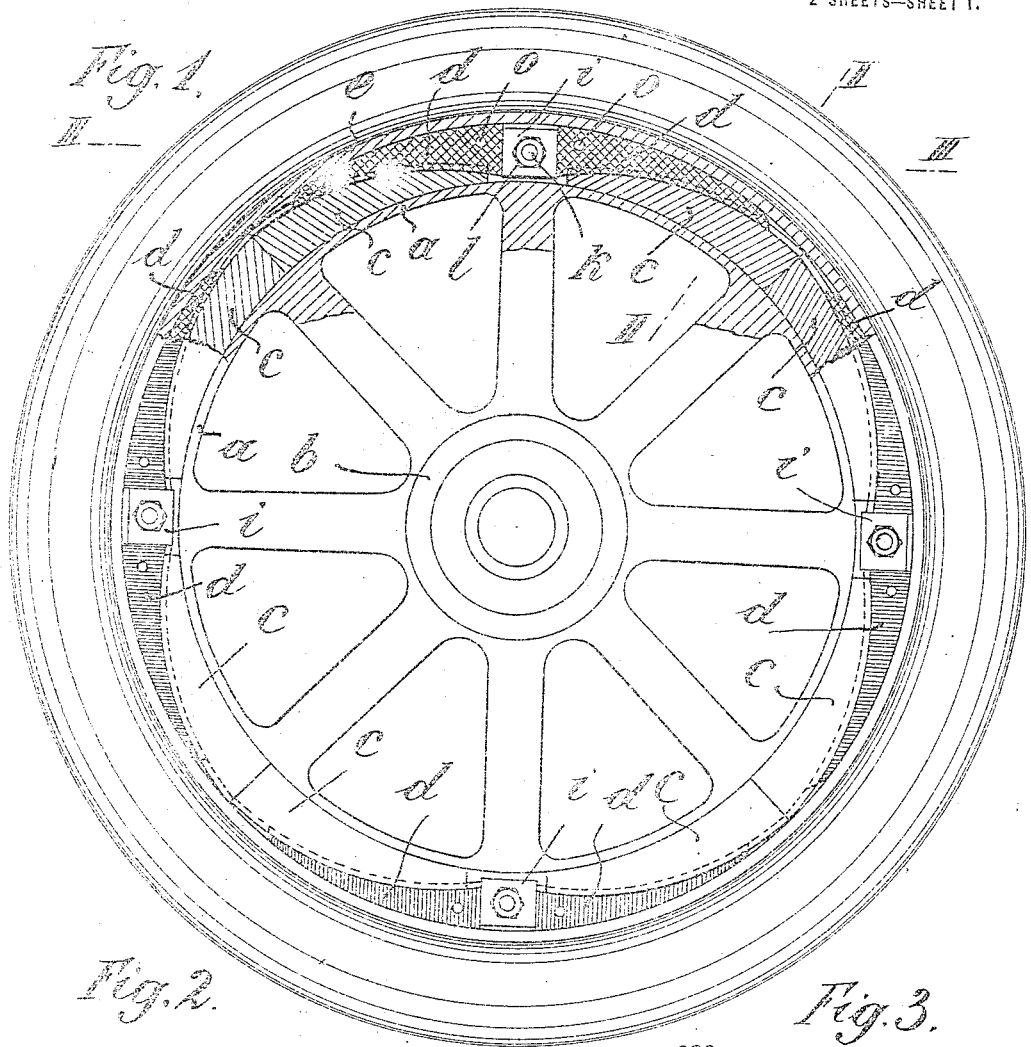
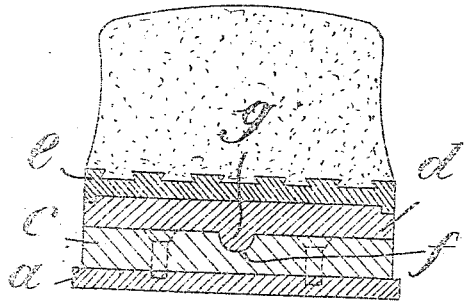
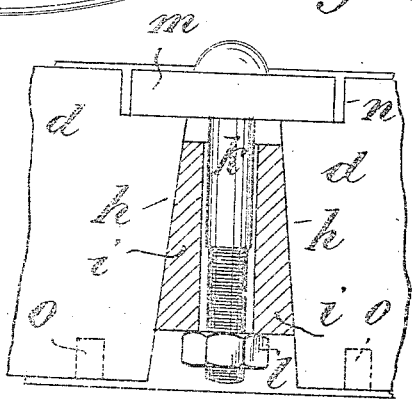

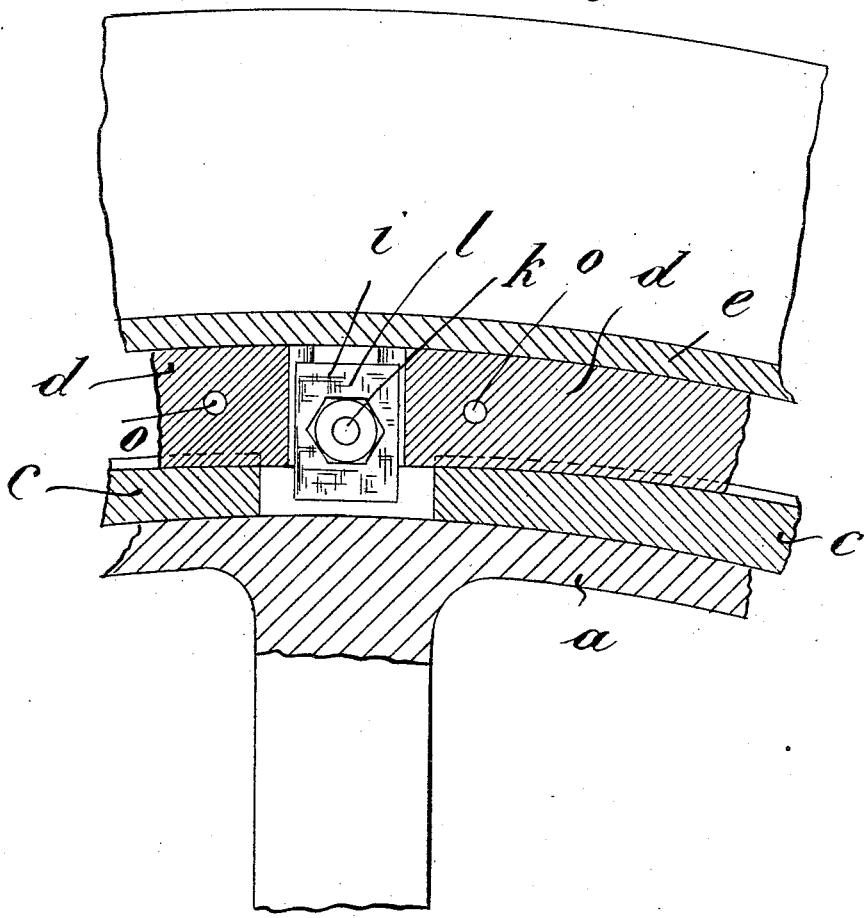

UNITED STATES PATENT OFFICE.

MAX POLACK, OF WALTERSHAUSEN, GERMANY.

WHEEL WITH DETACHABLE RIM FOR SOLID-RUBBER TIRES.

1,146,205.   Specification of Letters Patent.   Patented July 13, 1915.

Application filed July 14, 1914. Serial No. 851,018.

*To all whom it may concern:*

Be it known that I, MAX POLACK, subject of the Emperor of Germany, residing at Waltershausen, Thuringia, Germany, have invented certain new and useful Improvements in Wheels with Detachable Rims for Solid-Rubber Tires, of which the following is a specification.

With wheels with solid rubber tires, such as are used for vehicles of all kinds, it was hitherto customary and necessary to mechanically press the solid rubber tires which had been vulcanized on a steel rim onto the wheels and there unite them with the wheels. Obviously the tires had also to be mechanically removed from the wheels, as it was impossible to remove the tires by hand from the wheels. Therefore it entailed much labor to remove defective tires and refit fresh tires. Above all it was impossible to exchange a defective tire for a fresh one while on the road.

It has been proposed to render detachable the grip between tire and wheel by means of wedges, by making the wheel of a polygonal shape and providing on the inside of the tire rim twice as many surfaces as there were on the polygonal wheel. By such means triangular spaces were produced between the body of the wheel and the rim, into which wedges were driven in pairs, so as to obtain a strong but detachable lock between wheel and rim. In practice these proposals have not proved very satisfactory, as such arrangement required a comparatively large space and the wheel therefore became excessively heavy and assumed a not very handsome appearance, and then the body of the wheel, and above all the wheel rim had to be made of a special shape. All this rendered the wheel very expensive, so that the economical value became doubtful.

It is the object of the present invention to provide a means for securing the wheel rim which will obviate these drawbacks, and which will allow of readily mounting and dismounting the tire and, on the other hand, of affording a reliable lock between the body of the wheel and the rim which will not detach by itself. This object is attained according to the present invention by a system of wedges, the surfaces of which are formed by circular curves, of which system of wedges always one movable wedge coacts with a rigidly fixed wedge, the said pairs of wedges filling up a clear annular space between the body of the wheel and the rim in such a manner, that the one surface of the one wedge is curved to the radius of the wheel body, the surface of the other wedge to the radius of the wheel rim, while the surfaces of the wedges which lie against each other are curved to a radius forming the mean between the radius of the wheel body and that of the wheel rim. The wedges are driven in such a manner, that each two wedges are driven by a third wedge which is disposed vertically to the plane of the wheel and driven between the ends of the movable wedges, and are thereby forced into the space which is left free between the tire rim and the rigidly fixed wedges.

In the accompanying drawing an embodiment of the present invention is exemplified, Figure 1 being a wheel shown partly in section, the parts, however, not being all shown of the same scale. Fig. 2 is a sectional view on the line II—II in Fig. 1. Fig. 3 is a sectional view on the line III—III in Fig. 1, showing only a part of the section. The figures 2 and 3 being given on an enlarged scale. Fig. 4 is a part of the wheel according to the present invention, shown partly in section, in full size.

On the periphery of the wheel *a* which is turned in the ordinary, namely circular fashion is arranged a plurality of wedges *c*, which meet in pairs with their thicker ends, and are secured to the wheel by means of countersunk screws or the like. With these wedges *c* coact movable wedges *d*, which are likewise turned with their thick ends toward each other, and in their form closely follow the inside curvature of the tire rim *e*, while the coacting surfaces of the wedges *c* and *d* are curved to a radius which is about the mean between the radius of the periphery of the wheel body and that of the tire rim *e*. The fixed wedges *c* are provided on the surface bearing against the wedges *d* with a longitudinal groove *f*, in which the wedges *d* engage with a corresponding projection *g*, so as to prevent their moving or slipping sidewise.

The thick ends *h* of the wedges *d* are divergent and leave between themselves a space free for a wedge *i* tapered to their obliquity, which wedge *i* is arranged to be driven by means of a screw *k* and a nut *l* between the said pair of wedges *d* in a direction vertical to the plane of the wheel. The screw *k* bears against a plate *m*, which is fitted into recesses $n$ in the wedges $d$. For facilitating an easy dismantling the wedges $d$ are provided with recesses $o$, into which a pin or the like may be inserted, so as to more easily move them.

The advantages which the arrangement according to the present invention affords compared to previously disclosed arrangements consist essentially in the following: 1. The wedges $c$ and $d$ will by their fitting close to the wheel body and the tire rim allow of reducing the annular space between the wheel body and the tire rim to a minimum, as may be seen from Fig. 4, which shows a section of the wheel in full size, whereby the strength and steadiness of the wheel is increased to a considerable extent. 2. The machining of the wedges is extremely simple as the principal surfaces are formed by circular curves, and may therefore be turned on a lathe. 3. Both wheel body and tire rim may be made of the customary, normal shape, so that also these may be both turned on a lathe. 4. By the coacting of comparatively flat wedges a guarantee is given that the lock between the wheel body and the tire rim will not detach by itself.

I claim:

1. In wheels with detachable rims for solid rubber tires having an annular space formed between the wheel body and the rim, a series of alternately fixed and movable wedges symmetrically arranged in said annular space, said wedges being provided with circular wedging surfaces conforming in shape to the opposing surfaces of said rim and wheel body; the adjacent surfaces of each pair of movable wedges being transversely divergent, a locking key for each pair of movable wedges engaging with said diverging surfaces.

2. In wheels with detachable rims for solid rubber tires having an annular space formed between the wheel body and the rim, a series of alternately fixed and movable wedges, symmetrically arranged in said annular space, said wedges being provided with circular wedging surfaces conforming in shape to the opposing surfaces of said rim and wheel body; the adjacent surfaces of each pair of movable wedges being transversely divergent, a locking key for each pair of movable wedges engaging with said diverging surfaces and securing means for said locking keys acting in axial direction of the wheel.

In testimony whereof the foregoing specification is signed in the presence of two witnesses.

MAX POLACK.

Witnesses:
H. A. LOVIAGUINE,
AUG. MIGHIS.